United States Patent
Meis et al.

(10) Patent No.: US 8,801,207 B2
(45) Date of Patent: Aug. 12, 2014

(54) LIGHT DIRECTING SIGN SUBSTRATE

(75) Inventors: Michael A. Meis, Stillwater, MN (US); David G. Freier, St. Paul, MN (US); Patrick R. Fleming, Lake Elmo, MN (US); Ronald S. Steelman, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 10 days.

(21) Appl. No.: 13/519,361

(22) PCT Filed: Dec. 16, 2010

(86) PCT No.: PCT/US2010/060788
§ 371 (c)(1),
(2), (4) Date: Sep. 20, 2012

(87) PCT Pub. No.: WO2011/090625
PCT Pub. Date: Jul. 28, 2011

(65) Prior Publication Data
US 2013/0003354 A1   Jan. 3, 2013

(51) Int. Cl.
G09F 13/04    (2006.01)
G09F 13/08    (2006.01)

(52) U.S. Cl.
USPC .................. 362/97.1; 362/97.2; 362/97.3

(58) Field of Classification Search
None
See application file for complete search history.

(56) References Cited

U.S. PATENT DOCUMENTS

| | | | |
|---|---|---|---|
| 3,653,138 A | 4/1972 | Cooper | |
| 4,021,945 A | 5/1977 | Sussman | |
| 6,078,424 A | 6/2000 | Morton | |
| 6,231,201 B1 | 5/2001 | Rupp | |
| 6,724,536 B2 | 4/2004 | Magee | |
| 6,876,408 B2 | 4/2005 | Yamaguchi | |
| 6,970,288 B2 | 11/2005 | Ebina | |
| 2001/0012078 A1 | 8/2001 | Hira | |
| 2006/0056022 A1 | 3/2006 | Yeo | |
| 2006/0061869 A1 | 3/2006 | Fadel | |
| 2006/0164729 A1 | 7/2006 | Wood | |
| 2007/0002452 A1 | 1/2007 | Munro | |
| 2007/0002453 A1 | 1/2007 | Munro | |
| 2007/0127098 A1 | 6/2007 | Wood | |

FOREIGN PATENT DOCUMENTS

| | | |
|---|---|---|
| JP | 2000-047329 | 2/2000 |
| JP | 2000-199804 | 7/2000 |
| JP | 2006-030596 | 2/2006 |
| JP | 2006-318886 | 11/2006 |
| JP | 2006-330149 | 12/2006 |
| JP | 2007-003908 | 1/2007 |
| JP | 2008-225228 | 9/2008 |
| KR | 10-2009-0083688 | 8/2009 |
| WO | WO 2011-082140 | 7/2011 |
| WO | WO 2011-090625 | 7/2011 |

OTHER PUBLICATIONS

International Search Report for PCT/US2010/060788, Mailing Date Jul. 19, 2011, 3 pages.
International Search Report for PCT/US2010/062171, Mailing Date Aug. 18, 2011, 3 pages.

*Primary Examiner* — Natalie Walford
(74) *Attorney, Agent, or Firm* — Steven A. Bern; Colene H. Blank

(57) ABSTRACT

A light directing substrate includes a back major surface and a front major surface opposing the back surface. The back major surface includes light reflection regions and light transmission regions. The front surface includes a plurality of lenticular lens elements. A graphic image disposed on or in the light directing substrate.

14 Claims, 5 Drawing Sheets

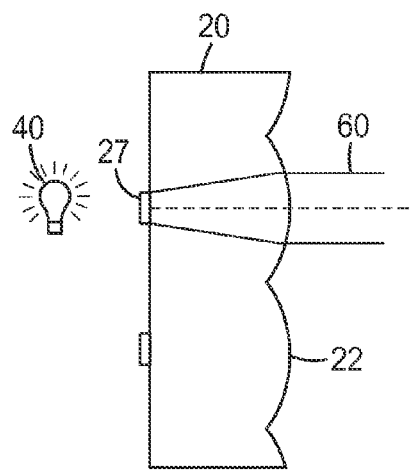
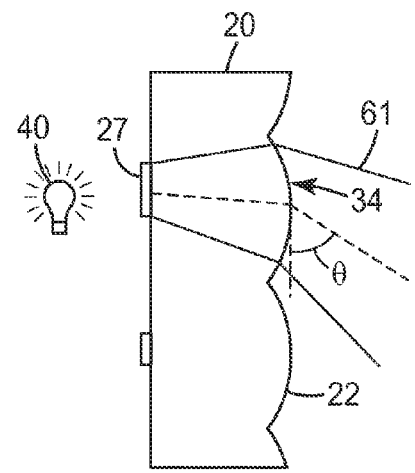
FIG. 5A    FIG. 5B
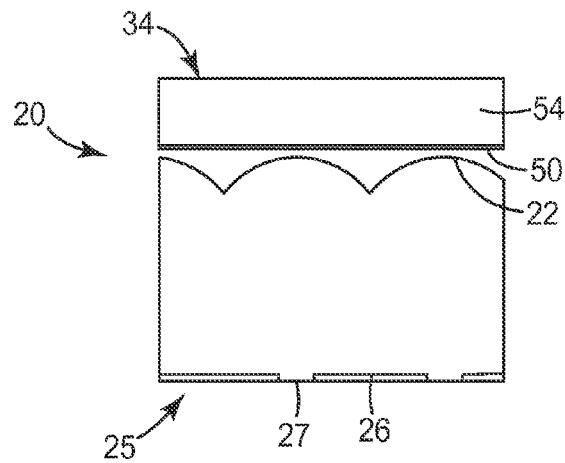
FIG. 6A
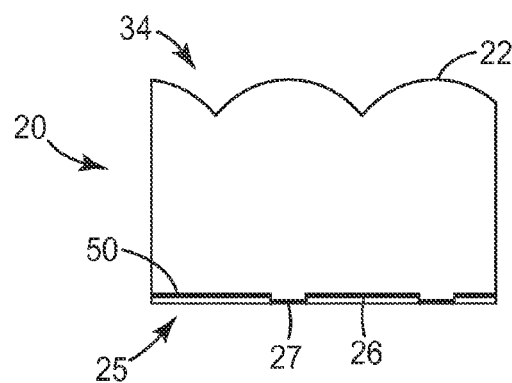
FIG. 6B

LIGHT DIRECTING SIGN SUBSTRATE

This application is a national stage filing under 35 U.S.C. 371 of PCT/US2010/060788, filed Dec. 16, 2010, which claims priority to U.S. Provisional Patent Application No.61/291143, filed Dec. 30, 2009,the disclosure of which is incorporated by reference in its/their entirety herein.

BACKGROUND

There are a number of major types of illuminated sign technologies presently in use. A first type are surface-painted signs which are illuminated by external light sources, such as floodlights, which are generally located at acute angles to the sign. Light energy is wasted since, a) the entire sign surface is illuminated (not just the message), and b) a great percentage of the light reflected never reaches the observer either being spilled off to the sky or ground.

A second type of illuminated sign is a lighted box sign where a light source is placed behind a translucent surface (that can provide structural support for the sign) with the message spelled out on the translucent surface, in characters contrasting to the translucent surface background. Light energy is produced to provide equal luminous emission over the face of the sign, including the background, as opposed to lighting only the character which has to be seen. Only a small fraction of the light produced reaches the eye of the observer, as the light exits the sign in all directions including upwards, thus wasting energy and causing a considerable amount of light pollution.

A third type of illuminated sign includes signs including light sources which themselves spell out the sign message. Neon signs, exposed incandescent filament lamp signs and channel letters are examples of this technology. When not lit, these signs are not readily visible (unless paint is applied under the character or symbol) and are thus totally dependent on being illuminated to deliver the message. These signs are costly to make, operate and maintain as they are custom made for the client, of limited life span, fragile and the incandescent version is energy wasteful.

A fourth type of illuminated sign includes an LED matrix sign. LED technology is taken advantage of to create changing-message signs. These dynamic message signs are computer-controlled and provide interesting and attention-grabbing signs which are a solution to illuminated signs with the need for a changing message.

However, most illuminated signs are of a fixed message, and these signs are initially expensive and costly to operate and maintain.

BRIEF SUMMARY

The present disclosure relates to energy efficient illuminated signs. In particular, the present disclosure relates to signage that includes a light collimating substrate to preferentially direct light toward a viewer.

In one illustrative embodiment, a light directing substrate includes a back major surface and a front major surface opposing the back surface. The back major surface includes light reflection regions and light transmission regions. The front surface includes a plurality of lenticular lens elements. A graphic image disposed on or in the light directing substrate.

These and various other features and advantages will be apparent from a reading of the following detailed description.

BRIEF DESCRIPTION OF THE DRAWINGS

The disclosure may be more completely understood in consideration of the following detailed description of various embodiments of the disclosure in connection with the accompanying drawings, in which:

FIG. 5A is a side elevation schematic diagram of an illustrative light directing substrate collimating light directly out of the illustrative light directing substrate;

FIG. 5B is a side elevation schematic diagram of an illustrative light directing substrate collimating light at an angle out of the illustrative light directing substrate;

FIG. 6A is a cross-sectional schematic diagram of an illustrative light directing substrate where the graphic image is adjacent to the lenticular lens element;

FIG. 6B is a cross-sectional schematic diagram of an illustrative light directing substrate where the graphic image is adjacent to a backside of the lens element;

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

Figure 1:
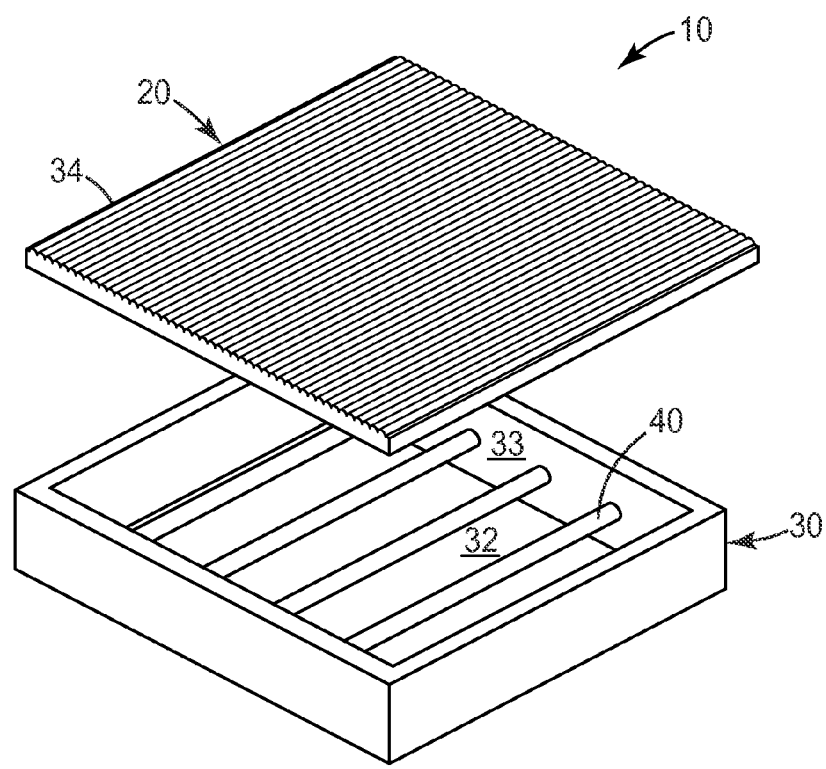
FIG. 1 is an exploded perspective schematic diagram of an illustrative illuminated sign.

In the following description, reference is made to the accompanying set of drawings that form a part hereof and in which are shown by way of illustration several specific embodiments. It is to be understood that other embodiments are contemplated and may be made without departing from the scope or spirit of the present disclosure. The following detailed description, therefore, is not to be taken in a limiting sense.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein.

As used in this specification and the appended claims, the singular forms "a", "an", and "the" encompass embodiments having plural referents, unless the content clearly dictates otherwise. As used in this specification and the appended claims, the term "or" is generally employed in its sense including "and/or" unless the content clearly dictates otherwise.

Spatially related terms, including but not limited to, "lower", "upper", "beneath", "below", "above", and "on top", if used herein, are utilized for ease of description to describe spatial relationships of an element(s) to another. Such spatially related terms encompass different orientations of the device in use or operation in addition to the particular orientations depicted in the figures and described herein. For example, if a cell depicted in the figures is turned over or flipped over, portions previously described as below or beneath other elements would then be above those other elements.

As used herein, when an element, component or layer for example is described as being "on" "connected to", "coupled with" or "in contact with" another element, component or layer, it can be directly on, directly connected to, directly coupled with, in direct contact with, or intervening elements, components or layers may be on, connected, coupled or in contact with the particular element, component or layer, for example. When an element, component or layer for example is referred to as begin "directly on", "directly connected to", "directly coupled with", or "directly in contact with" another element, there are no intervening elements, components or layers for example.

The term "graphic image" includes a solid color field, a likeness of something (that can include one or more colors), or combinations thereof.

The present disclosure relates to energy efficient illuminated signs. In particular, the present disclosure relates to signage that includes a light collimating substrate to preferentially direct light toward a viewer. The light collimating substrate includes light transmission windows that are registered with lenticular collimating lenses and light reflection areas between the light transmission windows. The angular distribution of the light exiting the illuminated sign is determined by the geometry of the lens and the size and position of the light transmission windows with respect to the focal point of the lens. Light that strikes the interior surface of the light collimating substrate between the light transmission windows is substantially reflected and recycled within the illuminated sign enclosure until it strikes a surface of a light transmission window and is transmitted through the light collimating substrate. In this manner the light emitted by the illuminated sign conforms to a controlled angular distribution of brightness. These illuminated signs exhibit diminished brightness where illumination is not desired (e.g., reduced "light pollution"), increased brightness where illumination is desired (e.g., to a viewer of the sign), and/or enhanced spatial uniformity of emission. While the present disclosure is not so limited, an appreciation of various aspects of the disclosure will be gained through a discussion of the examples provided below.

Figure 2:
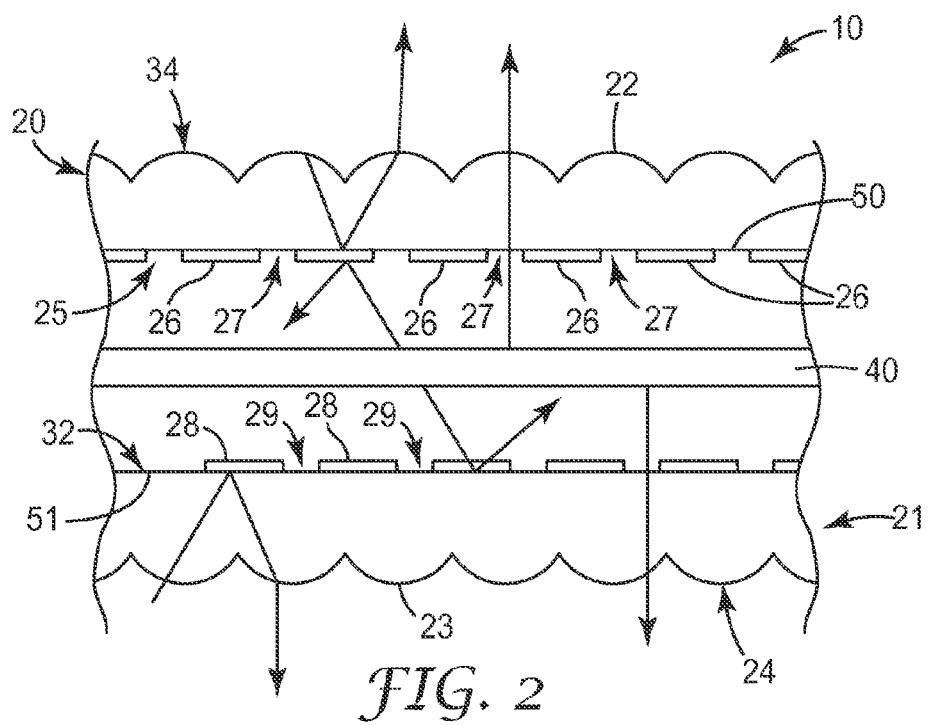
FIG. 2 is a cross-sectional schematic diagram of an illustrative illuminated sign.

FIG. 1 is an exploded perspective schematic diagram of an illustrative illuminated sign 10. FIG. 2 is a cross-sectional schematic diagram of an illustrative illuminated sign 10. The illuminated sign 10 includes an enclosure 30 and a light source 40 disposed within the enclosure 30. The enclosure 30 includes a light reflection surface 32, 33 and a light emission surface 34. In many embodiments, the enclosure 30 forms a light box having side surfaces 33 and a back surface 32. In some embodiments the back surface 32 is fully reflective. In some embodiments the back surface 32 includes a second light emission surface 24, as is illustrated in FIG. 2, forming a double-sided illuminated sign.

The light reflection surface 32, 33 can be formed of any useful light reflection material and can be highly efficient to maximize light efficiency. In many embodiments the light reflection surface 32, 33 are at least 90% efficient or at least 95% efficient. In some embodiments, the light reflection surface 32, 33 can be a reflective or mirror film. One commercially available reflective film is available under the trade designation Light Enhancement Film from 3M Company, St. Paul, Minn. The light reflection surface 32, 33 can be diffusely reflective or specularly reflective. Diffusely reflective surfaces can include white paint or a material that includes $TiO_2$ particles.

The light source 40 can be any useful light source 40. In some embodiments the light source 40 is fluorescent tubes. In some embodiments the light source 40 is solid state devices such as light emitting diodes, for example.

A light directing substrate 20 forms at least a portion of the light emission surface 34. The light directing substrate 20 can be self-supporting and form a structural element (front or back surface of the illuminated sign 10, for example). In many embodiments the light directing substrate 20 can have a thickness of 2500 micrometers or greater. The light directing substrate 20 includes a back major surface 25 forming a portion of an inner surface of the enclosure 30. The back major surface 25 includes light reflection regions 26 and light transmission regions 27. The light reflection regions 26 separate the light transmission regions 27. A front major surface 34 opposes the back major surface 25. The front surface 34 includes a plurality of lenticular lens elements 22. The light transmission regions 27 can be arranged to be at or near the focus points of the lenticular lens elements 22 and the light reflection regions 26 can occupy the remaining area of the back major surface 25.

FIG. 2 illustrates an embodiment of an illuminated sign including a second light directing substrate 21. The second light directing substrate 21 includes a back major surface 32 forming a portion of an inner surface of the enclosure 30. The back major surface 32 includes light reflection regions 28 and light transmission regions 29. The light reflection regions 28 separate the light transmission regions 29. A front major surface 24 opposes the back major surface 32. The front surface 24 includes a plurality of lenticular lens elements 23.

In many embodiments the lenticular lens elements 22, 23 are linear lenticular lens elements 22, 23 that are co-extensive across a length of the light directing substrate, as illustrated in FIG. 1. The lenticular lens elements 22, 23 can have any useful lens width. In many embodiments the lenticular lens elements 22, 23 have a lens width of 1 mm or greater.

A graphic image 50, 51 is included in many embodiments of the illuminated sign 10. The graphic image 50, 51 can be disposed at any useful location within or adjacent to the light directing substrate 20, 21. FIG. 2 illustrates the graphic image 50, 51 disposed between the light reflection regions 26, 28 and the lenticular lens elements 22, 23 or on the back major surface 25, 32. The light reflection regions 26, 28 reflect light both back into the enclosure 30 and reflect light from outside the enclosure back through the front major surface 34, 24. Thus the graphic image can be seen by a viewer when the sign is illuminated from within the enclosure 30 and when illuminated by exterior light (such as daylight for example) incident on the sign 10.

Figure 3:
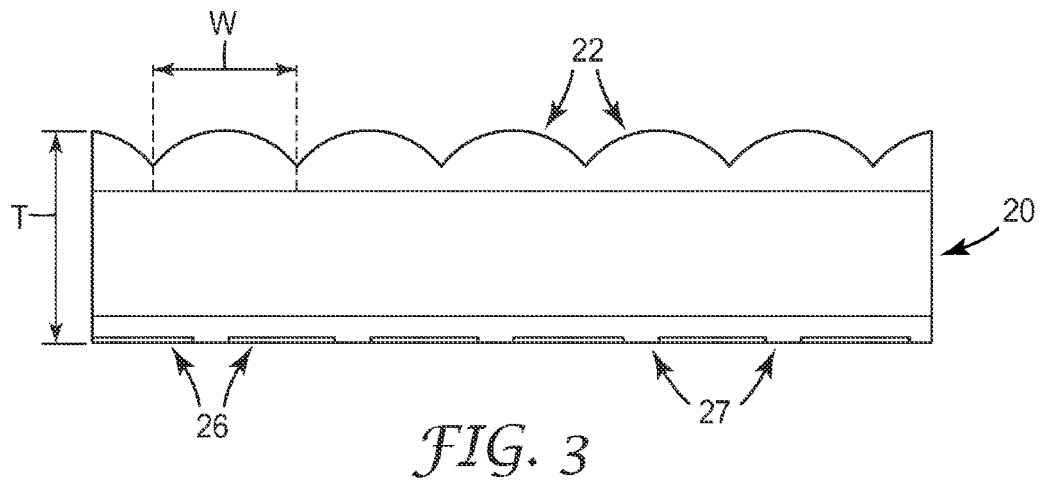
FIG. 3 is a cross-sectional schematic diagram of an illustrative light directing substrate.

FIG. 3 is a cross-sectional schematic diagram of an illustrative light directing substrate 20. The light directing substrate 20 includes lenticular lens elements 22 and light transmission regions 27 aligned or registered at or near a focal point of a corresponding lenticular lens element 22. Light reflection regions 26 occupy the remaining area separating the light transmission regions 27. The light reflection regions 26 can be formed of any useful light reflection (diffuse or specular) material. In many embodiments, the light reflection regions 26 are at least 90% efficient or at least 95% efficient. In some embodiments, the light reflection regions 26 can be a reflective or mirror film. One commercially available reflective film is available under the trade designation Light Enhancement Film from 3M Company, St. Paul, Minn. The light reflection regions 26 can be diffusely reflective or specularly reflective. Diffusely reflective surfaces can include white paint or a material that includes $TiO_2$ particles.

The light directing substrate 20 can have any useful thickness T. In many embodiments the light directing substrate 20 is self-supporting and can form a front structural element of the illuminated sign. In these embodiments the light directing substrate 20 has a thickness T of 2500 micrometers or greater. The lenticular lens elements 22 can have any useful lens width W. In many embodiments the lenticular lens elements 22 have a lens width W of 1 mm or greater. The light directing substrate 20 can be formed of any useful light transmissive material.

Figure 4A:
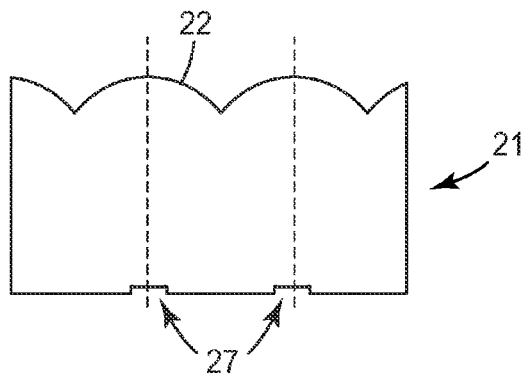
FIG. 4A is a cross-sectional schematic diagram of an illustrative lens element where the light transmitting regions are recesses in a backside of the lens element.
Figure 4B:
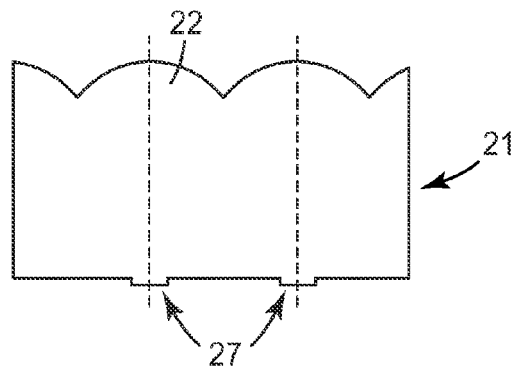
FIG. 4B is a cross-sectional schematic diagram of another illustrative lens element where the light transmitting regions are projections from a backside of the lens element.

FIG. 4A is a cross-sectional schematic diagram of an illustrative lens element 21 where the light transmitting regions 27 are recesses in a backside of the lens element 21. FIG. 4B is a cross-sectional schematic diagram of another illustrative lens element 21 where the light transmitting regions 27 are projections from a backside of the lens element 21. Both of these embodiments can be formed as a unitary structure and the light reflection area can be applied or formed on the unitary structure. In some embodiments the recesses of FIG. 4B are filled with light reflective material.

FIG. 5A is a side elevation schematic diagram of an illustrative light directing substrate 20 collimating light 60 directly out of the illustrative light directing substrate 20. The light transmitting regions 27 are aligned at or near the focal point of the lenticular lens element 22 and directs light 60 from the light source 40 within the enclosure normally out of the light directing substrate 20.

FIG. 5B is a side elevation schematic diagram of an illustrative light directing substrate 20 collimating light 61 at an angle θ out of the illustrative light directing substrate 20. Light 61 is collimated and emitted from the light directing substrate 20 at an angle of less than 90 degress from the front surface 34 of the light directing substrate 20. The light transmitting regions 27 are offset from the lenticular lens element 22 and directs light 60 from the light source 40 within the enclosure "downwardly" from the light directing substrate 20. This embodiment is particularly useful to reduce "light pollution" from illuminated signs. Thus light is not directed "upwardly" away from the typical ground level viewer. By changing the width of the light transmitting regions 27 the view angle is altered, and by changing the position of the light transmitting regions 27 the view angle can be adjusted.

FIG. 6A is a cross-sectional schematic diagram of an illustrative light directing substrate 20 where the graphic image 50 is adjacent to the lenticular lens element 22. This embodiment can be classified as an external decoration sign. The graphic image 50 can be disposed on a light transmissive substrate 54 and placed adjacent to the lenticular lens element 22. An outer or front major surface 34 of the light transmissive substrate 54 is the light emission surface or front major surface 34 of the light directing substrate 20. The opposing back major surface 25 includes light reflection regions 26 and light transmission regions 27, as described above. The light reflection regions 26 form recesses that separate the projecting light transmission regions 27. The light reflection regions 26 can be filled with light reflective material as described above. The graphic image 50 can be viewed by a viewer when the illuminated sign is illuminated from within the enclosure and when exterior light is incident on the light directing substrate 20 but not illuminated with a light source within the illuminated sign.

FIG. 6B is a cross-sectional schematic diagram of an illustrative light directing substrate 20 where the graphic image 50 is adjacent to a backside 25 of the lens element. This embodiment can be classified as an embedded decoration sign. The graphic image 50 can be disposed on the back major surface 25 of the light directing substrate 20 and disposed between the light reflection regions 26 and on the light transmission regions 27. In this embodiment the decoration or graphic image 50 could cover the entire back major surface 25 of the light directing substrate 20 including the light transmission regions 27 and the light reflection regions 26. The light reflection regions 26 form recesses that separate the projecting light transmission regions 27. The light reflection regions 26 can be filled with light reflective material as described above. The graphic image 50 can be viewed by a viewer when the illuminated sign is illuminated from within the enclosure and when exterior light is incident on the light directing substrate 20 but not illuminated with a light source within the illuminated sign.

Figure 7A:
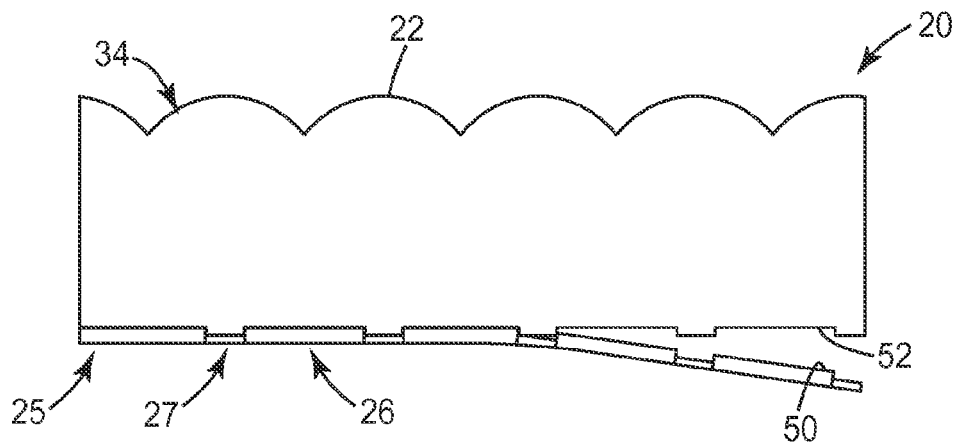
FIG. 7A and FIG. 7B are a cross-sectional schematic diagrams of illustrative light directing substrate where the graphic image is adjacent to a backside of the lens element.
Figure 7B:
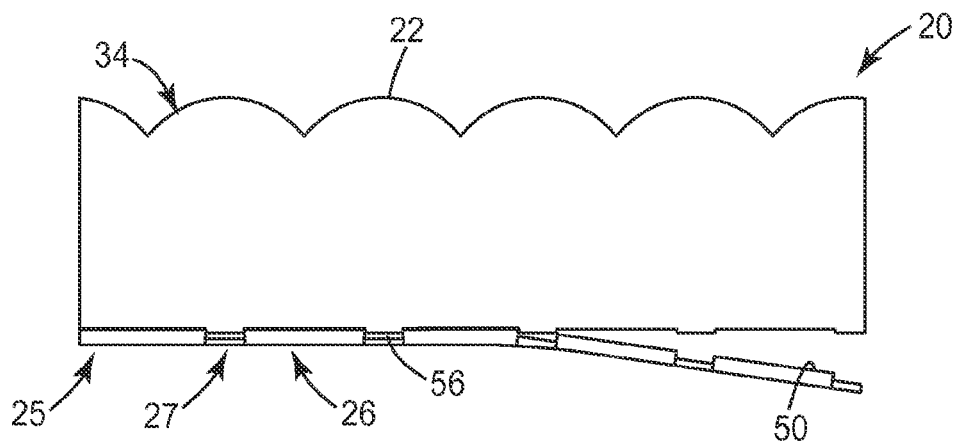

FIG. 7A and FIG. 7B are a cross-sectional schematic diagrams of illustrative light directing substrate 20 where the graphic image 50 is adjacent to a backside 25 of the lens element. A backside 25 of the lens element is formed to have light transmission regions 27 that protrude from the backside 25 of the lens element and light reflection regions 26 that form recesses between the light transmission regions 27. These recesses are filled with light reflective material.

In the illustrated embodiment a patterned reflector element is applied to the backside 25 of the lens element to fill the recesses and form the light reflection regions 26. The graphic image 50 is disposed on the patterned reflector element. The patterned reflector element includes a plurality of projections and recesses that are complementary with the backside 25 of the lens element and mates with the backside 25 of the lens element as illustrated. In many embodiments the patterned reflector element is formed of an elastomeric material. A low index of refraction coating material 52 can be disposed on the backside 25 of the lens element to enhance performance of the system. FIG. 7B illustrates the addition of air gaps 56 between the light transmission regions 27 and the graphic image 50 and patterned reflector element to enhance performance of the system.

Figure 8A:
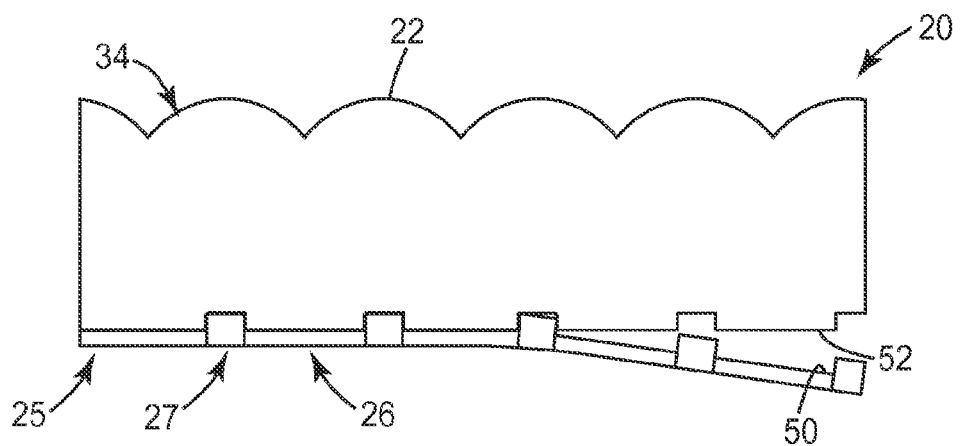
FIG. 8A and FIG. 8B are a cross-sectional schematic diagrams of illustrative light directing substrate where the graphic image is adjacent to a backside of the lens element.
Figure 8B:
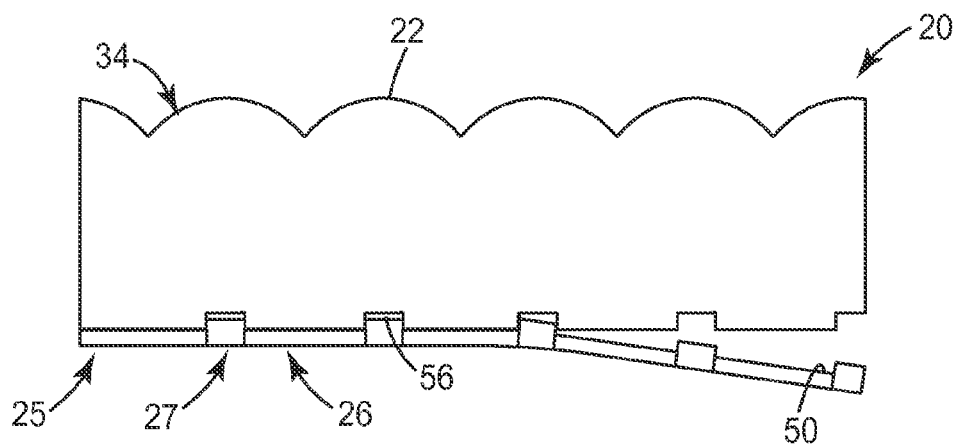

FIG. 8A and FIG. 8B are a cross-sectional schematic diagrams of illustrative light directing substrate where the graphic image is adjacent to a backside of the lens element. A backside 25 of the lens element is formed to have light transmission regions 27 that recess into the backside 25 of the lens element and light reflection regions 26 that protrude from the backside 25 of the lens element and separate the light transmission regions 27. These recesses are filled with light transmissive material and the light reflection regions 26 include light reflective material as described above.

In the illustrated embodiment a patterned reflector element is applied to the backside 25 of the lens element to fill the recesses and form the light reflection regions 26. The graphic image 50 is disposed on the patterned reflector element. The patterned reflector element includes a plurality of projections and recesses that are complementary with the backside 25 of the lens element and mates with the backside 25 of the lens element as illustrated. In many embodiments the patterned reflector element is formed of an elastomeric material. A low index of refraction coating material 52 is disposed on the backside 25 of the lens element. In some embodiments the low index of refraction coating material 52 is disposed only on light the transmission regions 27. FIG. 8B illustrates the addition of air gaps 56 between the light transmission regions 27 and the graphic image 50 and patterned reflector element.

Two identical illumined signs were constructed except that one illuminated sign held a conventional diffusing front substrate with graphic and the second illuminated sign held a light directing front substrate with graphic. Average brightness was measured at a particular viewing position. The illuminated sign that included the light directing front substrate with graphic had an average brightness that was over three times brighter than the illuminated sign that held the conventional diffusing front substrate with graphic.

Thus, embodiments of the LIGHT DIRECTING SIGN SUBSTRATE are disclosed. The implementations described above and other implementations are within the scope of the following claims. One skilled in the art will appreciate that the present disclosure can be practiced with embodiments other than those disclosed. The disclosed embodiments are presented for purposes of illustration and not limitation, and the present invention is limited only by the claims that follow.

What is claimed is:

1. A light directing substrate comprising:
   a back major surface comprising light reflection regions and light transmission regions;
   a front major surface opposing the back surface, the front surface comprising a plurality of lenticular lens elements; and
   a graphic image disposed on or adjacent to the back major surface of the light directing substrate.

2. A light directing substrate according to claims 1, wherein the plurality of lenticular lens elements are linear lenticular lens elements that are coextensive across a length of the light directing substrate.

3. A light directing substrate according to claims 1, wherein the lenticular lens elements have a length that is coextensive across a length of the light directing substrate and a width being greater than 1 mm.

4. A light directing substrate according to claims 1, wherein the light transmission regions are in registration with the lenticular lens elements.

5. A light directing substrate according to claims 1, wherein the light reflection regions reflect light from the back major surface and reflect light through the front major surface.

6. A light directing substrate according to claims 1, wherein the light directing substrate has a thickness being greater than 2500 micrometers.

7. A light directing substrate comprising:
   a lens element comprising a front surface comprising a plurality of lenticular lens elements and an opposing back surface;
   a patterned reflector adjacent to the back surface, the patterned reflector comprising light reflection regions and light transmission regions in registration with the plurality of lenticular lens elements; and
   a graphic image disposed between the back surface and the patterned reflector.

8. A light directing substrate according to claim 7, wherein the patterned reflector comprises an elastomeric material.

9. A light directing substrate according to claim 7, wherein the back surface comprises a plurality of recesses and the patterned reflector comprises a plurality of projections configured to mate with the plurality of recesses.

10. A light directing substrate according to claim 7, wherein a low refractive index coating is disposed on the back surface.

11. A light directing substrate according to claim 7, wherein an air gap separates portions of the graphic image and the back surface.

12. An illuminated sign comprising:
    an enclosure comprising a light reflection surface and a light emission surface;
    a light source disposed within the enclosure;
    a self-supporting light directing substrate forming at least a portion of the light emission surface, the light directing substrate comprising:
    a lens element comprising a front surface comprising a plurality of lenticular lens elements and an opposing back surface;
    a patterned reflector adjacent to the back surface, the forming a portion of an inner surface of the enclosure, the back surface comprising light reflection regions and light transmission regions, the light reflection regions or the light transmission regions form recesses in the back major surface;
    a front major surface opposing the back surface, the front surface comprising a plurality of lenticular lens elements; and
    a graphic image disposed on or adjacent the back surface in the light directing substrate.

13. An illuminated sign according to claim 12, wherein the light reflection regions reflect light back into the enclosure and reflect light through the front major surface.

14. An illuminated sign according to claim 13, wherein the graphic image is visible when the light source emits light and when the light source does not emit light.

* * * * *